United States Patent
Schultz et al.

(10) Patent No.: US 9,061,746 B2
(45) Date of Patent: *Jun. 23, 2015

(54) FLOTATION DEVICE

(71) Applicant: Hickory Springs Manufacturing Company, Hickory, NC (US)

(72) Inventors: Timothy M. Schultz, Dallas, NC (US); Jonathan W. Godfrey, Lincolnton, NC (US); John F. Herter, Lincolnton, NC (US)

(73) Assignee: Hickory Springs Manufacturing Company, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/269,952

(22) Filed: May 5, 2014

(65) Prior Publication Data
US 2014/0242861 A1     Aug. 28, 2014

Related U.S. Application Data

(63) Continuation of application No. 13/493,631, filed on Jun. 11, 2012, now Pat. No. 8,747,173.

(60) Provisional application No. 61/495,516, filed on Jun. 10, 2011.

(51) Int. Cl.
    *B63B 35/58*     (2006.01)
    *A63B 31/00*     (2006.01)
    (Continued)

(52) U.S. Cl.
    CPC .............. *B63B 35/58* (2013.01); *A63B 31/00* (2013.01); *B63B 2035/7903* (2013.01); *B63B 2231/50* (2013.01); *B29C 47/0035* (2013.01);

(Continued)

(58) Field of Classification Search
    CPC ............ B63B 1/00; B63B 35/73; B63B 35/79
    USPC ............................ 441/55, 56, 58, 65, 74, 129
    See application file for complete search history.

(56) References Cited

U.S. PATENT DOCUMENTS

| | | |
|---|---|---|
| 3,871,812 A | 3/1975 | Phipps |
| 4,069,285 A | 1/1978 | Morgan |

(Continued)

FOREIGN PATENT DOCUMENTS

| | | |
|---|---|---|
| CA | 2 258 497 A1 | 10/1998 |
| WO | WO 98/07473 | 2/1998 |
| WO | WO-98/47402 A1 | 10/1998 |

OTHER PUBLICATIONS

ASTM International; ASTM D 1056—00; pp. 1-15; Jul. 2000; Conshohocken, PA; Revelant pages p. 2 at §3.2.4.

(Continued)

*Primary Examiner* — Lars A Olson
(74) *Attorney, Agent, or Firm* — Alston & Bird LLP

(57) ABSTRACT

The presently disclosed subject matter relates to a flotation device suited to teach beginner swimming techniques or provide enjoyment in an aquatic environment while providing flotation to at least a portion of the swimmer's body. The flotation device for aiding a swimmer in a body of water may comprise a body formed from an extruded foam and comprising a top surface, a bottom surface, a first side rail, a second side rail, a leading lateral surface, and a trailing lateral surface, and wherein the extruded foam is a flexible cellular foam. The presently disclosed subject matter also relates to methods of making the flotation device.

22 Claims, 4 Drawing Sheets

Figure 1:
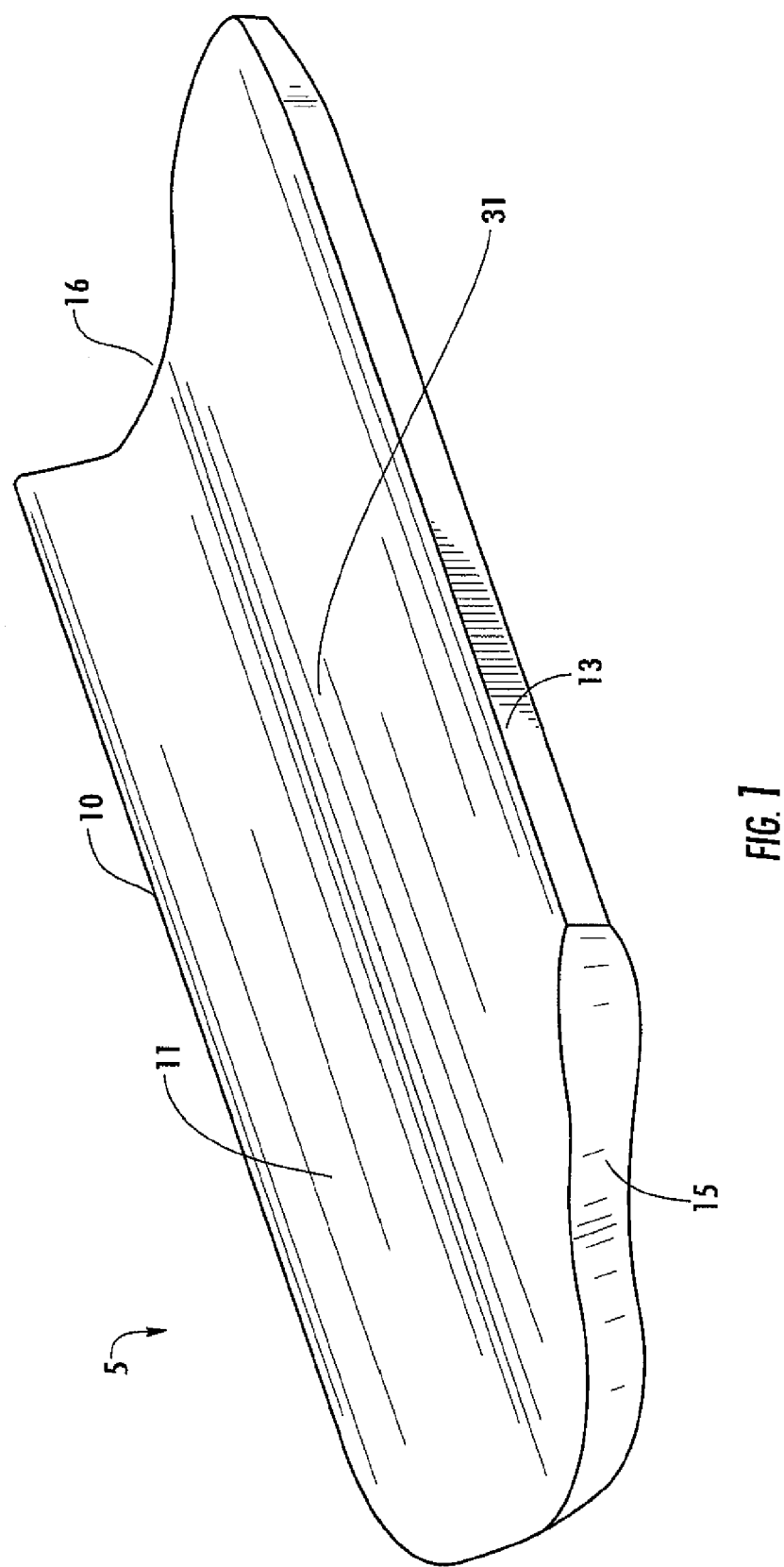

(51) Int. Cl.
*B29C 47/00* (2006.01)
*B63B 35/79* (2006.01)

(52) U.S. Cl.
CPC ......... *B29C47/0066* (2013.01); *A63B 2209/00* (2013.01); *A63B 2225/605* (2013.01)

(56) References Cited

U.S. PATENT DOCUMENTS

| | | | |
|---|---|---|---|
| 4,292,019 | A | 9/1981 | Hay et al. |
| 4,362,518 | A | 12/1982 | Boissiere |
| 4,364,722 | A | 12/1982 | Phipps |
| 4,395,214 | A | 7/1983 | Phipps et al. |
| 4,406,628 | A | 9/1983 | Rademacher |
| 4,781,638 | A | 11/1988 | Winters |
| 4,850,913 | A | 7/1989 | Szabad, Jr. |
| 4,907,520 | A | 3/1990 | Pipkorn |
| 4,932,912 | A | 6/1990 | Combs |
| 5,116,269 | A | 5/1992 | Moran |
| 5,275,860 | A | 1/1994 | D'Luzansky et al. |
| 5,518,429 | A | 5/1996 | Gravlin |
| 5,531,849 | A | 7/1996 | Collins et al. |
| 5,571,036 | A | 11/1996 | Hannigan |
| 5,634,834 | A | 6/1997 | Cole et al. |
| 5,846,461 | A | 12/1998 | Collins et al. |
| 5,875,792 | A | 3/1999 | Campbell et al. |
| 5,897,409 | A | 4/1999 | Hartmann et al. |
| 6,402,578 | B1 | 6/2002 | Zappitelli |
| 6,428,651 | B1 | 8/2002 | Princell et al. |
| 6,790,112 | B2 | 9/2004 | Kirk |
| 6,840,066 | B2 | 1/2005 | Dickerson |
| 6,872,111 | B2 | 3/2005 | Katz et al. |
| 6,908,351 | B2 | 6/2005 | Burke |
| 6,984,596 | B2 | 1/2006 | Dickerson |
| 7,074,098 | B1 | 7/2006 | Acosta, Jr. |
| D631,926 | S | 2/2011 | Arzente et al. |
| 8,143,433 | B2 | 3/2012 | Layman et al. |
| 8,350,074 | B2 | 1/2013 | Layman et al. |
| 8,575,225 | B2 | 11/2013 | Layman et al. |
| 8,747,173 | B1 | 6/2014 | Schultz et al. |
| 2007/0235124 | A1 | 10/2007 | Van Dyke |
| 2008/0014810 | A1 | 1/2008 | Mix |
| 2009/0246240 | A1 | 10/2009 | Holmberg |
| 2013/0052896 | A1 | 2/2013 | Abraham |
| 2013/0294823 | A1 | 11/2013 | Bartow et al. |

OTHER PUBLICATIONS

O'Rourke, James P.; Filed Nov. 25, 1996; USPTO Trademark Registration No. 2,107,382 for FUNNOODLE®.
US Trademark Specimen for Reg. No. 2,107,382 showing a photograph of a "FunBeam" flotation device; All pages; Nov. 25, 1996.
US Trademark Specimen for Reg. No. 2,107,382 showing a photograph of a "FunRay" flotation device; All pages; Oct. 21, 2002.
US Trademark Specimen for Reg. No. 2,107,382 showing a photograph of a "FunNoodle" flotation device; All pages; May 10, 2007.
First Declaration of David Duncan; ¶¶7-8.
Second Declaration of David Duncan; ¶¶5-9.
Protest under 37 C.F.R. 1.291, dated Oct. 28, 2014; U.S. Appl. No. 14/489,003, filed Sep. 17, 2014, Hickory Springs Manufacturing Company, 1-24.
*ASTM C 1427—an ASTM Standard for a flexible cellular organic polymeric material*; undated; retrieved on Jun. 6, 2011.
"Kickboards;" SwimWays; retrieved on Feb. 18, 2014 from <http://www.swimways.com/kickboards-c-50.aspx>.
"Tabla de Natación o de Pateo Sunny Grande-Azul;" Shop Mania; retrieved on Feb. 18, 2014 from <http://www.shopmania.com.mx/other/p-tabla-de-natacion-o-de-pateo-sunny-grande-azul-5220412>.
U.S. Appl. No. 61/495,516, filed Jun. 10, 2011; In re: Schultz et al., entitled *Flotation Device*.
ASTM D 1056-00—Standard Specification for Flexible Cellular Materials—Sponge or Expanded Rubber; Case 5:14-cv-00093-RLV-DCK, Document 27-9, filed Sep. 5, 2014, pp. 2-16.
ASTM C 1427, Case 5:14-cv-0093-RLV-DCK, Document 27-7, Filed Sep. 5, 2014, pp. 5.
ASTM C 1427-99a, Specification for Preformed Flexible Cellular Polyolefin Thermal Insulation in Sheet and Tubular Form, Case 5:14-cv-00093-RLV-DCK, Document 27-8, Filed Sep. 5, 2014, pp. 2-6.

FLOTATION DEVICE

CROSS-REFERENCE TO RELATED APPLICATIONS

This application is a continuation of U.S. application Ser. No. 13/493,631, filed Jun. 11, 2012, which claims priority under 35 U.S.C. §119 to U.S. Provisional Application No. 61/495,516, filed Jun. 10, 2011, which are incorporated by reference herein in their entirety.

BACKGROUND OF THE INVENTION

The present invention relates to a flotation device suited to teach beginner swimming techniques or provide enjoyment in an aquatic environment while providing flotation to at least a portion of the swimmer's body.

In the past, flotation devices have been utilized to teach basic swimming techniques. Prior art flotation devices have been constructed using a polyethylene foam core with composite materials laminated to the top, bottom, and side rails of the polyethylene core. Other flotation devices are constructed using polystyrene foam that is blown into a fabric shell. Further, other prior art flotation devices are constructed with a polystyrene core that is heat bonded to composite materials that surround the entire polystyrene core. However, when bonding a polystyrene core to other composite covering materials, it is often difficult to obtain an acceptable bonding strength between the polystyrene core and the composite covering materials. An additional disadvantage in using polystyrene foam includes covering the foam with other materials to preserve the structural integrity. Prior art flotation devices have been designed with a focus on balancing structural rigidity and material density as some prior art flotation devices have preferred designs that utilize stiffer materials to improve the aquatic performance of the flotation device. Moreover, while polystyrene may offer a greater structural stiffness than other polymer foams of a similar density, it is more susceptible to damage from impact forces. Many of these construction methods involve numerous steps or high production costs.

Accordingly, it is desirable to provide a flotation device, which is capable of providing minimal water resistance and increased durability over the existing prior art.

BRIEF SUMMARY

Various embodiments of the present invention are directed to a flotation device suited to teach beginner swimming techniques or provide enjoyment in an aquatic environment while providing flotation to at least a portion of the swimmer's body. In one embodiment, the flotation device may comprise a body formed from an extruded foam and comprising a top surface, a bottom surface, a first side rail, a second side rail, a leading lateral surface, and a trailing lateral surface. According to some embodiments, the extruded foam may be a flexible cellular foam.

According to one embodiment, the extruded foam may be a flexible cellular organic polymeric material configured to not rupture within 60 seconds when a specimen of the flexible cellular organic polymeric material with dimensions of approximately 8 inches by 1 inch by 1 inch is bent around a mandrel having a diameter of approximately 1 inch at a uniform rate of one lap in 5 seconds in the form of a helix at a temperature between 65 and 85 degrees Fahrenheit.

One embodiment may include a flotation device, wherein the flotation device includes a longitudinal dimension greater than a lateral dimension. The flotation device may also have a longitudinal stiffness along the longitudinal axis of the flotation device that is greater than a lateral stiffness along the lateral axis of the flotation device. In some embodiments, the flotation device may further comprise a leading lateral surface shaped to be reciprocal to a trailing lateral surface.

According to one embodiment, the body of the flotation device may further comprise a top skin, a bottom skin, a first side rail skin, and a second side rail skin. In some embodiments, the top skin, the bottom skin, the first side rail skin and the second side rail skin of the body of the flotation device may be configured to be substantially impermeable to fluids. In another embodiment, the skins may be formed from the foam material during the extrusion process.

According to some embodiments, the flotation device may be configured to have a lateral curvature when viewed in cross section that extends across the top surface and the bottom surface of the flotation device. In some embodiments, the flotation device may be configured to have a plurality of curves when viewed in cross section that extend across the top surface and bottom surface of the flotation device. In another embodiment, the flotation device may be configured to have a lateral curvature that extends across the top surface that is shaped so as to be reciprocal of the lateral curvature that extends across the bottom surface. The flotation device may further include at least a central curve and at least two perimeter curves. In some embodiments, the curvature of the central curve may open in an opposite direction from the curvature of the at least two perimeter curves. In another embodiment, the width of the curvature of the central curve may be greater than the width of the curvature of the at least two perimeter curves.

According to one embodiment, a method of manufacturing a flotation device may comprise extruding a flexible cellular polyethylene foam through a die, wherein the shape of the die corresponds to the lateral shape of the flotation device when taken perpendicularly to a longitudinal dimension of the flotation device and defines a lateral curvature when viewed in cross section that extends across a top surface and a bottom surface of the flotation device. Further, the method may comprise feeding the extruded cellular polyethylene foam through a rotary die cutter to thereby create the flotation device comprising a top surface, a bottom surface, a first side rail, a second side rail, a leading lateral surface, and a trailing lateral surface. The method may further comprise a method of manufacturing a flotation device, wherein the lateral curvature that extends across the top surface is shaped so as to be reciprocal of the lateral curvature that extends across the bottom surface. According to some embodiments, the method may include manufacturing a flotation device wherein the flotation device is configured to have a plurality of curves that extend across the top surface and the bottom surface of the flotation device. In another embodiment, the method may include manufacturing a flotation device wherein the plurality of curves includes at least a central curve and at least two perimeter curves. In some embodiments, the method may include manufacturing a flotation device wherein the width of the curvature of the central curve is greater than the width of the curvature of the at least two perimeter curves.

According to one embodiment, the method may include manufacturing a flotation device wherein the rotary die cutter cuts the flexible cellular polyethylene foam to define the lateral trailing surface of one flotation device and the lateral leading surface of an ensuing flotation device at the same time. In some embodiments, the method may include manufacturing a flotation device wherein the rotary die cutter is configured to cut the extruded flexible cellular polyethylene foam at a time interval so as to create a flotation device having a greater longitudinal dimension compared to the lateral dimension of the flotation device. The method may include extruding a flexible cellular polyethylene foam through a die so as to form a plurality of skins on each of the top surface, bottom surface, a first side rail surface and a second side rail surface of the flotation device. In some embodiments, the method may include manufacturing a flotation device wherein a rotary die cutter is configured to cut through the plurality of skins on each of the top surface, the bottom surface, and each of the side rail surfaces so as to create a leading lateral surface and a trailing lateral surface without a corresponding leading lateral skin or a trailing lateral skin.

In some embodiments, the method may include extruding a flexible cellular polyethylene foam through a die shaped to provide a curvature to the extruded flexible cellular polyethylene foam. In another embodiment, the method may include manufacturing a flotation device, wherein the flotation device includes a longitudinal stiffness that is less than a lateral stiffness of the flotation device.

BRIEF DESCRIPTION OF THE SEVERAL VIEWS OF THE DRAWING(S)

Figure 2:
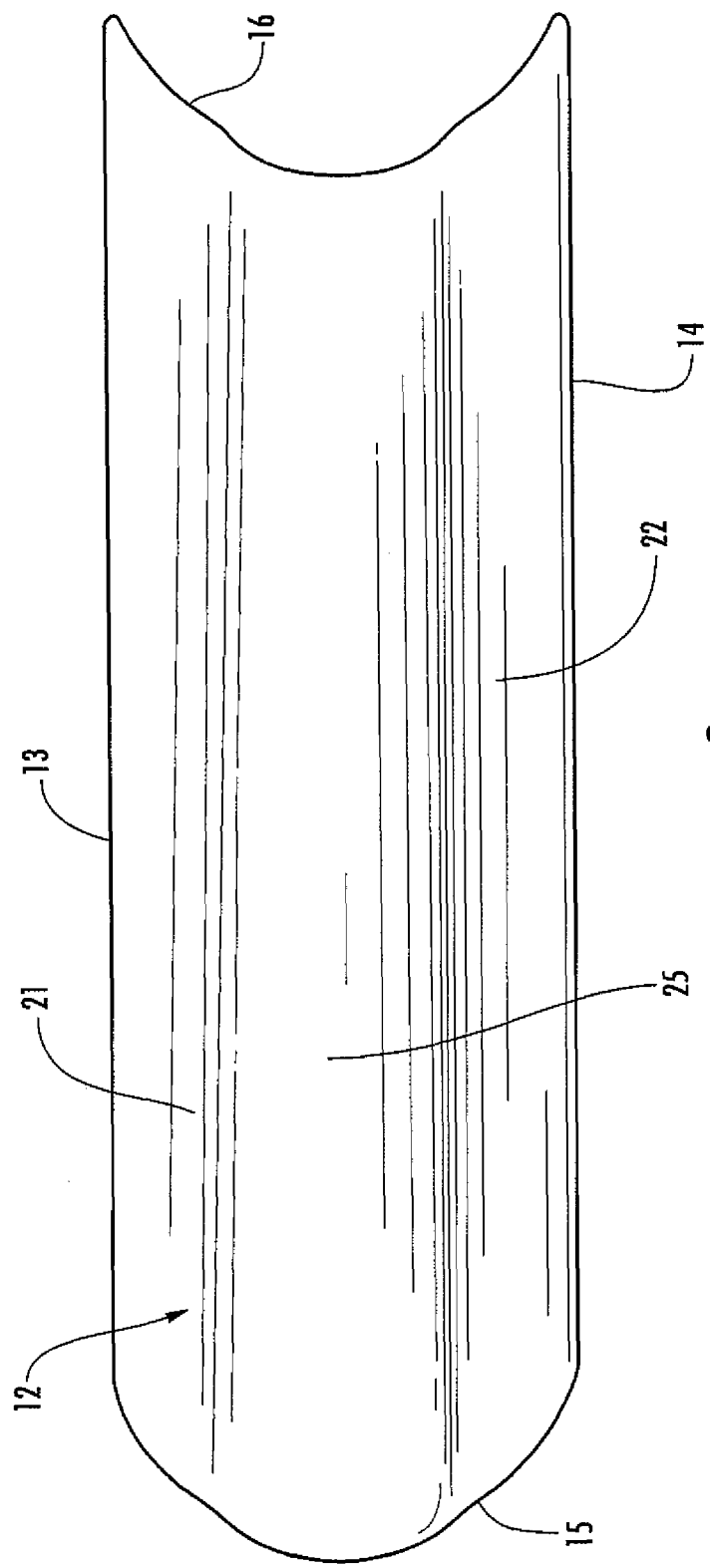
Figure 3:
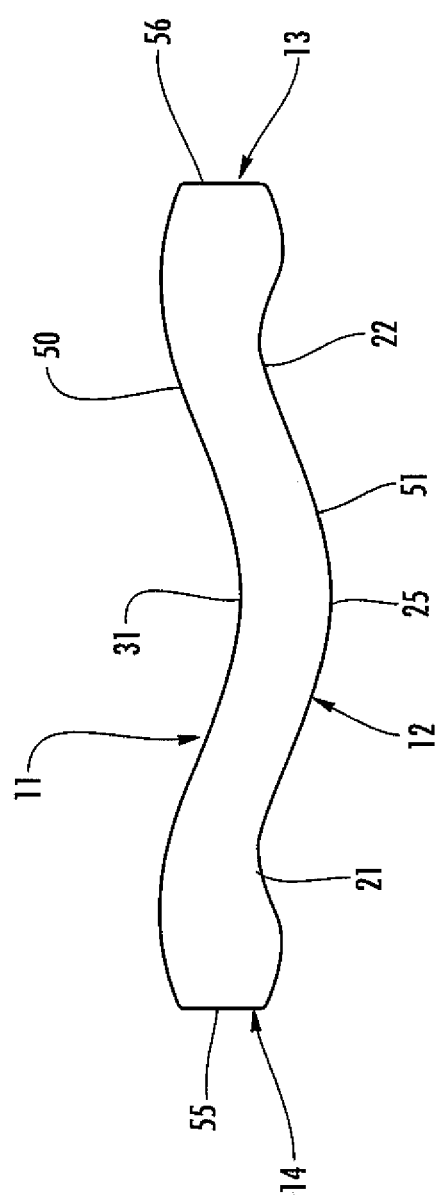
Figure 4:
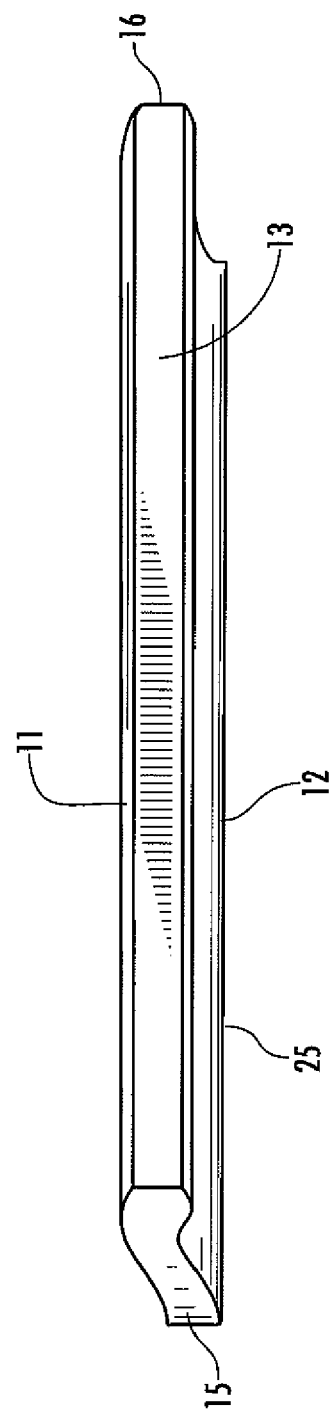

Having thus described the invention in general terms, reference will now be made to the accompanying drawings, which are not necessarily drawn to scale, and wherein:

FIG. 1 is a perspective top view of a flotation device;
FIG. 2 is a bottom view of the flotation device;
FIG. 3 is a rear view of the flotation device; and
FIG. 4 is a side view of the flotation device.

DETAILED DESCRIPTION OF THE INVENTION

The present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Embodiments of the present invention provide a flotation device, such as a swim raft. The flotation device may be configured to minimize resistance as the flotation device moves through the water or other fluid. Furthermore, the flotation device may be configured to maximize flexibility without sacrificing durability.

FIGS. 1 through 4 illustrate a flotation device 5 in accordance with embodiments of the present invention. The flotation device 5 may include a unitary body 10 that comprises a top surface 11 and a bottom surface 12. Further, the flotation device comprises longitudinal side rails 13, 14 that may be substantially parallel with respect to one another. Coupled to the longitudinal side rails are a laterally-extending lateral leading surface 15 and a laterally-extending lateral trailing surface 16. According to one embodiment of the present invention, the lateral leading surface and the lateral trailing surface may include a curved shape. The curved lateral leading surface may be of parabolic shape, but one skilled in the art will appreciate that a curved lateral leading surface may be modified to have any shape. Similarly, the lateral trailing surface may be of parabolic shape, but may also be modified to have any shape. In the illustrated embodiment, the parabolic shape of the lateral trailing surface advantageously fits and mates to the leading lateral surface of each flotation device. In one embodiment of the present invention, a method of manufacturing the flotation device 5 may include the use of a rotary die cutter. Accordingly, the advantageous fit and mating of the leading lateral surface of one flotation device to the lateral trailing surface of another flotation device provides for minimal waste of materials.

As illustrated in FIGS. 1 through 4, one embodiment of the present invention discloses a top surface 11 and a bottom surface 12. As shown in FIG. 2, one embodiment of the present invention may include two bottom channels 21, 22, which are defined by the bottom surface 12. The bottom channels 21, 22 are positioned to be substantially parallel to the longitudinal side rails 13, 14. In another embodiment, however, the bottom channels may be angled from the lateral leading surface to the lateral trailing surface so as to create a v-shaped wedge, wherein the spacing between the bottom channels are disposed closer to one another proximate to the lateral leading surface compared to the spacing between the bottom channels proximate to the lateral trail surface. In one embodiment, the bottom channels 21, 22 begin at the lateral leading surface 15 and end at the lateral trailing surface 16.

Additionally, according to one embodiment of the present invention, a flotation device 5 may include a central protrusion 25, which is also defined by the bottom surface 12. This central protrusion 25 may also be substantially parallel to the bottom channels 21, 22 and/or the longitudinal side rails 13, 14. Likewise, the central protrusion 25 begins at the lateral leading surface 15 and ends at the lateral trailing surface 16. Although the current embodiment, as illustrated in FIGS. 1 through 4, shows only two bottom channels 21, 22 and a singular protrusion 25, one skilled in the art will appreciate that additional embodiments of the present invention may include additional bottom channels and protrusions. Further, according to one embodiment, the central protrusion 25 is flanked by the two bottom channels 21, 22. However, in other embodiments, a flattened portion of the flotation device may be disposed between the central protrusion and the bottom channels. Further still, the central protrusion 25 may include a constant lateral width as the central protrusion extends longitudinally along the flotation device.

FIG. 1 further illustrates a central channel 31 defined by the top surface 11. The central channel 31 is also positioned to extend substantially parallel to the longitudinal side rails 13, 14. The central channel 31 runs from the lateral leading surface 15 to the lateral trailing surface 16. The central channel 31 provides the user with an ergonomic fit as the user rests their body on the flotation device. According to one embodiment, the central channel 31 may be defined by the central protrusion 25 such that the depth of the central channel is defined by the vertical extension of the central protrusion. Although the embodiments illustrated in FIGS. 1 through 4 illustrate that the depth of the central channel is defined by the vertical extension of the central protrusion, one skilled in the art may appreciate that the depth of the central channel may be any depth, so long as the depth of the central channel is not greater than the extension height of the central protrusion from the bottom surface. In addition, the central channel 31 may include a constant lateral width as the central channel extends longitudinally along the flotation device.

Furthermore, in one embodiment, the longitudinal side rails 13, 14 are substantially larger in length than the lateral leading surface 15 and the lateral trailing surface 16. Accordingly, the length of the flotation device is substantially longer than the width of the flotation device, which provides a beginning swimmer with more contact surface area to rest their body. In one embodiment of the present invention, the flotation device may have a width of about 11.5 inches and a thickness of about 1.5 inches.

In addition, the flotation device may have a longitudinal stiffness that is defined by the bending stiffness of the flotation device when measured along the longitudinal axis, which is parallel to the longitudinal side rails 13, 14. Accordingly, the flotation device may also have a lateral stiffness that is defined by the bending stiffness of the flotation device when measured along the lateral axis that is perpendicular to the longitudinal side rails 13, 14. According to some embodiments, the side rails 13, 14 may be slightly larger than the central portion therebetween for increased longitudinal stiffness without substantially increasing lateral stiffness.

As a beginner swimmer may not be comfortable submersing their body into the water, the flotation device 5 provides the user with a top surface 11 configured to support a significant portion of their body out of the water. Furthermore, the substantially shorter width of the flotation device compared to the length of the flotation device provides a beginner swimmer with the ability to utilize the full range of motion of the shoulders and arms. As such, the flotation device advantageously allows the user to swim with full strokes instead of abbreviated motions. Thus, a beginner swimmer using the flotation device may learn correct swimming strokes rather than an abbreviated "doggy paddle" type stroke.

As illustrated in FIG. 3, the body 10 further comprises a top skin 50 and a bottom skin 51. The top skin 50 covers the entire top surface 11. Further, the bottom skin 51 covers the entire bottom surface 12. Likewise, the body 10 further comprises a pair of longitudinal side rail skins 55, 56 that cover the entire longitudinal side rails 13, 14. According to one embodiment, the plurality of skins is formed by extruding the polyethylene along the side rails 13, 14 and the skins 50, 51, 55, 56 define a continuous skin surface around the body 10. Thus, rather than cutting the entire shape of the flotation device 5 with a rotary die cutter or other manufacturing process, the side rails are formed with the longitudinal side rail skins through the extrusion process. Accordingly, these skins aid in preventing water from penetrating the interior of the flotation device 5. Although the flotation device is generally constructed of buoyant materials, increased saturation of the flotation device would ultimately force the user to exert more physical force to move the flotation device through the water. Therefore, the plurality of skins 50, 51, 55, 56 would be advantageous to a beginner swimmer or one who is focused on enjoying the aquatic environment as the plurality of skins assist in decreasing the amount of energy one would expend by limiting the saturation of the flotation device.

The illustrated embodiment of the flotation device 5, as shown in FIGS. 1 through 4, is constructed from extruded low density polyethylene flexible cellular foam. Polyethylene may be available in either cross-linked polyethylene, linear low density polyethylene, low density polyethylene, high density polyethylene form, and may also comprise polyethylene blended with other polymers. The current embodiment of the flotation device 5 is constructed using a low density polyethylene. The polyethylene allows the flotation device to be flexible and maintain structural integrity. Furthermore, the polyethylene allows the flotation device to resist impact forces and remain flexible when normal stresses are applied to the flotation device. Another advantageous aspect of an embodiment of the present invention provides a swimmer with a flexible flotation device configured to remain underneath the swimmer's body during use. The flexibility of the flotation device prevents the device from surfacing unexpectedly when supporting a swimmer's body. Further, the flexibility of the flotation device further provides a flotation device configured to conform in part to the swimmer's body when placed underneath the swimmer's body. In addition, embodiments of the present invention advantageously provide a plurality of skins 50, 51, 55, 56 that include a texture, which may in part aid in preventing the device from surfacing unexpectedly when supporting the swimmer's body. An additional advantage of an embodiment of the present invention includes a flotation device that provides a beginner swimmer with the ability to utilize the flotation device without the need for any additional attachments, such as straps, or without the need to hold the flotation device in place with the beginner swimmer's hands. Accordingly, the beginner swimmer may utilize the flotation device without having to hold onto the device with his or her hands. As such, the flotation device advantageously allows a beginner swimmer to utilize full and correct strokes when learning and/or practicing various swimming techniques. According to another embodiment of the present invention, the flotation device may be flexible, while maintaining structural integrity to support an adult sitting on the flotation device while partially submerged in the water. The flexibility and texture of the plurality of the skins of the flotation device allows an adult user to sit and/or straddle the device while being supported in the water such that a portion of the adult's upper body is not submerged in the water.

As previously mentioned, one method of manufacturing the flotation device, according to one embodiment, may include the use of a rotary die cutter. The polyethylene is extruded in a direction parallel to the side rails 13, 14. As the polyethylene is extruded along the side rails, the die cutter creates the flotation device 5 by making a single cut that simultaneously forms the lateral trailing edge of one flotation device and the lateral leading edge of another flotation device. Thus, the method may advantageously limit the amount of polyethylene that is wasted during the manufacturing process.

Because most beginner swimmers are children of young age, one skilled in the art would appreciate the increased durability and flexibility according to embodiments of the present invention. Furthermore, the method according to one embodiment of the present invention may provide for limiting wasted material by utilizing a rotary die cutter. In addition, the method may include extruding the material in a direction parallel to the side rails. Extruding the material in such a manner may allow the formation of the longitudinal side rail skins. Furthermore, another advantage provided by the aforementioned method may include the construction of a flotation device having a uniform color therethrough. The combination of the use of polyethylene and the extrusion process allows for the manufacturing of the flotation device without laminating other materials, which may be different colors, or composition to the flotation device. Accordingly, the method may include a process that provides for a singularly colored flotation device manufactured by extruding the material along the side rails of the flotation device with a rotary die cutter.

Another advantage of an embodiment of the present invention may include the varying possible length of the flotation device. In addition to the formation of the longitudinal side rail skins, manufacturing the flotation device by extruding the material and cutting the material with a die cutter may also provide the additional advantage of producing flotation devices with varying lengths. One may vary the lengths of the flotation device by varying the speed or frequency of the die cutter. In order to manufacture lengthier flotation devices, one would change the drum diameter and blade spacing of the rotary die cutter, thus allowing for more material to pass through the die press before making a separating cut. Likewise, to create shorter flotation devices, one would decrease the spacing of the blades in the rotary die cutter, thus allowing for less material to pass through the die press before making the cut. Accordingly, the method may advantageously provide a process for manufacturing the flotation device which may include adjusting the length of the flotation device by varying the die configuration of the die cutter. Also, minor changes to the length could be made by varying the speed and tension of the rotary press. A faster speed may produce shorter lengths, while a slower speed may produce longer lengths of the flotation device.

EXAMPLE

The following Example has been included to provide guidance to one of ordinary skill in the art for practicing representative embodiments of the presently disclosed subject matter. In light of the present disclosure and the general level of skill in the art, those of skill can appreciate that the following Example is intended to be exemplary only and that numerous changes, modifications, and alterations can be employed without departing from the scope of the presently disclosed subject matter.

Example 1

Characterization of Flotation Device Flexibility

According to one embodiment of the present invention, the flexibility of the flotation device may be tested according to standards devised by ASTM International. ASTM C 1427 defines "flexible cellular" as a flexible cellular organic polymeric material that will not rupture within 60 seconds when a specimen with dimensions of 8 inches by 1 inch by 1 inch (200 mm by 25 mm by 25 mm) is bent around a 1 inch (25 mm) diameter mandrel at a uniform rate of one lap in 5 seconds in the form of a helix at a temperature between 65 and 85 degrees Fahrenheit (18 and 29 degrees Celsius). A test was performed with the materials of the flotation device according to one embodiment in accordance with the above-described method, which resulted in the flotation device material not rupturing, tearing, delaminating, or breaking. Further, another test was preformed with the materials of the flotation device according to one embodiment in accordance with the above-described method with increased dimensions for the specimen consisting of 8 inches by 1.5 inches by 1.5 inches (representing the full thickness of the device of the embodiment), which resulted in the flotation device material not rupturing, tearing, delaminating, or breaking.

Furthermore, a method according to one embodiment of the present invention may include varying the thickness of the flotation device by adjusting the thickness of the extrusion of polyethylene or other materials used in constructing the flotation device. Thus, the thickness of the flotation device may vary from 1 to 2 inches in height, and may be adjusted by varying the thickness of the extrusion of the materials used in manufacturing the flotation device. In addition, a method according to one embodiment of the present invention may include varying the width of the flotation device by adjusting the width of the extrusion of polyethylene or other materials used in constructing the flotation device. Accordingly, the thickness of the flotation device may vary from approximately 6 to 18 inches in width, and may be adjusted by varying the thickness of the extrusion of the materials used in manufacturing the flotation device.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed. Although specific terms are employed herein, they are used in a generic and descriptive sense only and not for purposes of limitation.

That which is claimed:

1. A flotation device for aiding a swimmer in a body of water, the flotation device, comprising:
    a body formed from an extruded foam and comprising:
        a top surface,
        a bottom surface,
        a first side rail,
        a second side rail,
        a leading lateral surface, and
        a trailing lateral surface,
    wherein the leading and trailing lateral surfaces are cut surfaces and the first and second side rails are extruded surfaces,
    and wherein the extruded foam is a flexible cellular foam.

2. The flotation device of claim 1, wherein the extruded foam is a flexible cellular organic polymeric material configured to not rupture within 60 seconds when a specimen of the flexible cellular organic polymeric material with dimensions of 8 inches by 1 inch by 1 inch is bent around a 1 inch diameter mandrel at a uniform rate of one lap in 5 seconds in the form of a helix at a temperature between 65 and 85 degrees Fahrenheit.

3. The flotation device of claim 1, wherein the flotation device includes a longitudinal dimension greater than a lateral dimension.

4. The flotation device of claim 1, wherein the flotation device has a longitudinal stiffness along the longitudinal axis of the flotation device greater than a lateral stiffness along the lateral axis of the flotation device.

5. The flotation device of claim 1, wherein the leading lateral surface is shaped so as to be a reciprocal shape of the trailing lateral surface.

6. The flotation device of claim 1, wherein the body further comprises:
    a top skin,
    a bottom skin,
    a first side rail skin, and
    a second side rail skin.

7. The flotation device of claim 6, wherein the top skin, the bottom skin, the first side rail skin, and the second side rail skin are configured to be substantially impermeable to fluids.

8. The flotation device of claim 7, wherein the skins are formed from the foam material during an extrusion process.

9. The flotation device of claim 1, wherein the flotation device is configured to have a lateral curvature when viewed in cross section that extends across the top surface and bottom surface of the flotation device.

10. The flotation device of claim 9, wherein the flotation device is configured to have a plurality of curves that extend across the top surface and bottom surface of the flotation device.

11. The flotation device of claim 10, wherein the lateral curvature that extends across the top surface is shaped so as to be reciprocal of the lateral curvature that extends across the bottom surface.

12. The flotation device of claim 11, wherein the plurality of curves includes:
    at least a central curve, and
    at least two perimeter curves.

13. The flotation device of claim 12, wherein the curvature of the central curve opens in an opposite direction from the curvature of the at least two perimeter curves.

14. The flotation device of claim 13, wherein the width of the curvature of the central curve is greater than the width of the curvature of the at least two perimeter curves.

15. A flotation device, comprising:
a body formed from an extruded foam and including:
a leading lateral surface having a shape;
a trailing lateral surface opposite the leading lateral surface and having a shape;
a first surface traversing the body and extending from the leading lateral surface to the trailing lateral surface;
a second surface on an opposite side of the body from the first surface and extending from the leading lateral surface to the trailing lateral surface;
a first longitudinal side rail extending from the leading lateral surface to the trailing lateral surface and from the first surface to the second surface; and
a second longitudinal side rail on an opposite side of the body from the first longitudinally extending side rail and extending from the leading lateral surface to the trailing lateral surface and from the first surface to the second surface,
wherein the leading and trailing lateral surfaces are cut surfaces and the first and second surface and the first and second longitudinal side rails comprise extruded surfaces.

16. The flotation device of claim 15, wherein the shape of the trailing lateral surface is reciprocal of the shape of the leading lateral surface.

17. The flotation device of claim 15, wherein the second surface has a shape that is reciprocal of the first surface.

18. The floatation device of claim 15, wherein only the first surface, the second surface, the first longitudinal side rail and the second longitudinal side rail comprise an integral skin formed from the extruded foam.

19. A flotation device, comprising:
a body formed from an extruded foam and including:
a leading lateral cut surface having a shape;
a trailing lateral cut surface opposite the leading lateral surface and having a shape;
a first extruded surface traversing the body and extending from the leading lateral cut surface to the trailing lateral cut surface, wherein the first extruded surface comprises an integral skin formed from the extruded foam;
a second extruded surface on an opposite side of the body from the first extruded surface and extending from the leading lateral surface to the trailing lateral surface, wherein the second extruded surface comprises an integral skin formed from the extruded foam;
a first longitudinal side rail having an extruded foam surface extending from the leading lateral cut surface to the trailing lateral cut surface and from the first extruded surface to the second extruded surface, wherein the extruded foam surface of the first longitudinal side rail comprises an integral skin formed from the extruded foam; and
a second longitudinal side rail having an extruded foam surface on an opposite side of the body from the first longitudinally extending side rail and extending from the leading lateral surface to the trailing lateral surface and from the first surface to the second surface, wherein the extruded foam surface of the second longitudinal side rail comprises an integral skin formed from the extruded foam.

20. The flotation device of claim 19, wherein the trailing lateral cut surface is reciprocal of the leading lateral cut surface.

21. The flotation device of claim 19, wherein the flotation device is configured to have a lateral curvature when viewed in cross section that extends across the top surface and bottom surface of the flotation device.

22. The flotation device of claim 21, wherein the flotation device is configured to have a plurality of curves that extend across the top surface and bottom surface of the flotation device.

* * * * *